United States Patent
Puzak et al.

(10) Patent No.: US 7,441,110 B1
(45) Date of Patent: Oct. 21, 2008

(54) PREFETCHING USING FUTURE BRANCH PATH INFORMATION DERIVED FROM BRANCH PREDICTION

(75) Inventors: Thomas R. Puzak, Ridgefield, CT (US); Allan M. Hartstein, Chappaqua, NY (US); Mark Charney, Millwood, NY (US); Daniel A. Prener, Croton-on-Hudson, NY (US); Peter H. Oden, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1732 days.

(21) Appl. No.: 09/458,883

(22) Filed: Dec. 10, 1999

(51) Int. Cl.
*G06F 9/44* (2006.01)
*G06F 9/45* (2006.01)

(52) U.S. Cl. .................. 712/237; 712/207; 717/153; 717/161

(58) Field of Classification Search ............. 712/235, 712/205, 206, 207, 237; 717/159, 161, 157
See application file for complete search history.

(56) References Cited

U.S. PATENT DOCUMENTS

| | | | |
|---|---|---|---|
| 5,854,934 A | 12/1998 | Hsu et al. | 395/709 |
| 6,065,115 A * | 5/2000 | Sharangpani et al. | 711/122 |
| 6,212,603 B1 * | 4/2001 | McInerney et al. | 712/207 |

* cited by examiner

*Primary Examiner*—William H Wood
(74) *Attorney, Agent, or Firm*—Michael J. Buchenhorner; Vazken Alexanian

(57) ABSTRACT

A mechanism is described that predicts the usefulness of a prefetching instruction during the instruction's decode cycle. Prefetching instructions that are predicted as useful (prefetch useful data) are sent to an execution unit of the processor for execution, while instructions that are predicted as not useful are discarded. The prediction regarding the usefulness of a prefetching instructions is performed utilizing a branch prediction mask contained in the branch history mechanism. This mask is compared to information contained in the prefetching instruction that records the branch path between the prefetching instruction and actual use of the data. Both instructions and data can be prefetched using this mechanism.

20 Claims, 15 Drawing Sheets

Pending Branch Prediction Logic

```
              ENTRY                      Program Segment
                .
                .                            ⎫
                .                            ⎬  1
                .                            ⎭
              Test   X                       ⎫
              BC     EQ,Jump1   Branch  B1   ⎬
                .                            ⎬  2
                .                            ⎬
              Test   X                       ⎬
              BC     EQ,Jump2   Branch  B2   ⎭
                .                            ⎫
                .                            ⎬
              Touch  A          Prefetch  A  ⎬
                .                            ⎬  4
                .                            ⎬
              Load   R5,A       Use       A  ⎬
                .                            ⎭
              Return
       Jump1  *                               ⎫
                .                             ⎬  3
                .                             ⎭
              Test   X
              BC     EQ,Jump3   Branch  B3   ⎫
                .                            ⎬
                .                            ⎬
              Touch  C          Prefetch  C  ⎬
                .                            ⎬  6
                .                            ⎬
              Load   R5,C       Use       C  ⎬
                .                            ⎭
              Return
       Jump2  *
                .                            ⎫
              Touch  B          Prefetch  B  ⎬
                .                            ⎬  5
                .                            ⎬
              Load   B          Use       B  ⎬
                .                            ⎭
              Return
       Jump3  *
                .                            ⎫
              Touch  D          Prefetch  D  ⎬
                .                            ⎬  7
                .                            ⎬
              Load   D          Use       D  ⎬
              Return                         ⎭
```

Figure 1

TOUCH INSTRUCTION FORMAT

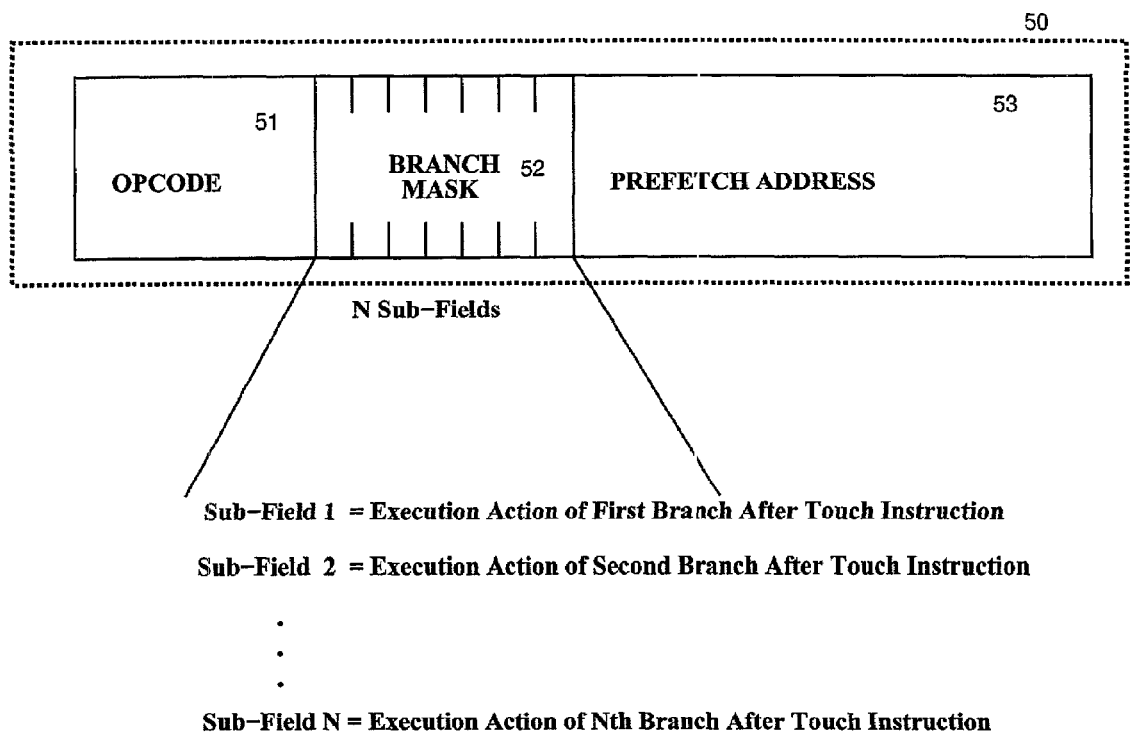

Sub-Field 1 = Execution Action of First Branch After Touch Instruction

Sub-Field 2 = Execution Action of Second Branch After Touch Instruction

•
•
•

Sub-Field N = Execution Action of Nth Branch After Touch Instruction

The Branch Action Can Be One Of The Following Values:
T = The Branch Is Taken
N = The Branch Is Not-Taken
D = The Branch Can Either Be Taken Or Not-Taken, 'Don't Care'

Prefetch Address Can Denote A Base Register + Displacment or
A Relative Offset From the Touch Instruction

Figure 4

Branch Mask = Branch Mask Contained In Touch Instruction

Branch IID = Instruction Identifier Of Last Branch Decoded

BMVB = Branch Mask Validation Bit

Execution Information = Address Of Item To Prefetch, ...

PREFETCHING USING FUTURE BRANCH PATH INFORMATION DERIVED FROM BRANCH PREDICTION

CROSS-REFERENCE TO RELATED APPLICATIONS

This application relates to subject matter that is similar to that of the copending application having Ser. No. 09/459,739 which was also filed on Dec. 10, 1999 and is assigned to the same entity.

STATEMENT REGARDING FEDERALLY-SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

1. Technical Field

This invention is in the field of data processing, and specifically is directed to the conditional execution of prefetching instructions inserted in a program by a compiler or programmer.

2. Related Art

A cache is a small, high-speed buffer of memory, logically placed between the processor and main memory, and is used to hold those sections of main memory that are referenced most recently. Caches are needed in today's processors because the speed of the processor is much faster than its main memory. The cache system that is logically placed between the processor and main memory may be hierarchical in nature having multiple levels of cache memory. Any memory request that is found in the cache system is satisfied quickly, usually in one or two cycles, whereas a request that misses the cache and is satisfied from memory may take several cycles. It is not uncommon for a request that is satisfied from memory to take 20 to 30 cycles or longer than a request that is satisfied from the cache. Each request that misses the cache and is found in memory, usually, delays the processor for the length of the miss.

Prefetching is a technique that is commonly used to reduce the delays caused by cache misses. Prefetching mechanisms attempt to anticipate which sections of memory will be used by a program and fetch them into the cache before the processor would normally request them. Typically, the sections of memory are called lines and range in size from 128 to 256 bytes. If the prefetching mechanism is successful then a line of memory is transferred into the cache far enough ahead, in time, to avoid any processing stalls due to a cache miss.

A commonly used prefetching technique involves inserting prefetching instructions into a program. For example, the paper "Software Prefetch" by Callahan et al, in the Proceedings of the Fourth International Conference on Architectural Support For Programming Languages and Operating Systems, April 1991 describes adding new instructions that perform prefetching into the instruction set. Also, the IBM RS/6000 and PowerPC processors have an instruction, the Data-Cache-Block-Touch (dcbt) instruction that prefetches a line of memory into the cache. A compiler (which may use static and/or dynamic compilation techniques), or a programmer can insert these prefetching instructions (which is referred to below as a touch instruction) into the program ahead of the actual use of the information in an attempt to assure that the line of memory will be in the cache when a subsequent instruction in the program is executed. Touch instructions can be used to prefetch instructions and data. For example, a touch instruction can be inserted into a program ahead of an upcoming branch to prefetch the instructions located at the target of the branch. Similarly, a touch instruction can be placed ahead of the load instruction to prefetch the data into the cache.

We begin by describing our patent application through the following program example. FIG. 1 shows a program containing three branches and four touch instructions. The three branches break the program into seven program segments. The three branches are numbered B1, B2, and B3 and identify branches BC EQ,Jump1, BC EQJump2, and BC EQ,Jump3, respectively. The numbering scheme used for the seven program segments will become apparent in the next figure. The four touch instructions prefetch data items A, B, C, and D. There are four Load instructions that fetch data items A, B, C, and D into register 5. FIG. 2 represents a tree graph for the same program. The three branches divide the program into seven program segments. Each program segment is numbered and placed inside a circle. The not-taken path for each branch is shown as the left edge of a tree fork and the taken path is the right edge. The four Load instructions are located in the four leaf segments of the tree, program segments 4, 5, 6, and 7, respectively. The four touch instructions, prefetch locations A, B, C, and D, are also located in program segments 4, 5, 6, and 7, respectively, but occur ahead of their Load instruction counterparts.

In order to increase the amount of time between prefetching a block of memory into the cache and its subsequent use by another instruction the compiler may try to move the touch instruction up in the program. However, moving the prefetching instructions out of the original program segment and into an earlier program segment does not always improve performance and can even decrease performance by causing unnecessary or unused prefetches to occur.

For example, consider the program control flow graph shown in FIG. 2. If the compiler moves the touch instructions for datum A found in program segment 4 into segment 2 (to increase the amount of time between prefetching the item and its subsequent use) then it is, in essence, trying to predict the outcome of the branch B2 (BC EQ,Jump2), either taken or not-taken. In this case the compiler must assume that branch B2 is not-taken. If the actual execution flow of the program is from segment 2 to segment 5, because the branch is taken, then datum item A is prefetched and not used.

Similarly, the compiler can move both touch instructions, for data items A and B, into program segment 2. Now, segment 2 will prefetch both A and B. However, depending on the outcome of the branch, only one prefetch will be used. If the branch is not-taken, then the prefetch for A was correct and the prefetch for B was not used. If the branch is taken, then B is used and A is not used.

There are several reasons why inaccurate or unsuccessful prefetches should be avoided. First, each pre-fetch that is not used contaminates the cache with useless information and wastes valuable cache space. Second, when an unsuccessful prefetch is made the replacement algorithm must choose a line currently in the cache to be discarded. Then, if the discarded line is referenced before another miss occurs then an additional (and unnecessary) miss occurs. Third, when the prefetched line is transferred to the cache, the processor may be blocked from referencing the cache during the line transfer cycles. Recall, that if the cache line is 128 bytes and the transfer bus is 8 bytes wide then 16 cycles are needed to copy the line into the cache. Fourth, each unused prefetch wastes valuable bus cycles to transfer the line of memory into the cache. If a real (necessary) cache miss occurs during this time than the bus will be busy transferring a useless prefetch and the real cache miss is delayed.

It is the subject of this invention to allow the compiler to move all four touch instructions (for A, B, C, and D) into program segment 1 (as shown in FIG. 3) and with a high degree of accuracy to execute only those prefetching instructions that produce useful prefetches. In this example it appears that all four touch instructions will be executed each time program segment 1 is executed, however only one prefetch will produce a useful prefetch. Depending on the branch actions (either taken or not-taken) for branches B1, B2, and B3 only one of the leaf nodes of the program tree will be reached. The other three leaf nodes represent un-executed code. Our prefetching mechanism relies on the proven predictability of branches to allow the branch-prediction-mechanism to capture the repetitive nature of an execution path through a program. The Branch-prediction-mechanism retains information regarding the execution path of a program and supplies this information to the processor. The processor then determines which touch instructions to execute and discards those touch instructions along not-taken paths of a program. Also, by selectively executing a touch instruction the compiler can liberally place and aggressively 'move up' the prefetching instructions in a program to increase the distance between the prefetching instruction and its actual use by another instruction and thus increase the performance gained by the prefetch.

For example, it is well known in the art that branches can be predicted with a high degree of accuracy. Typically, branches are either predominately taken or not-taken and it is common to use the previous action of a branch to predict the next (or future) action of that branch. Using modern branch prediction algorithms, it is common for branch prediction mechanisms to achieve a prediction accuracy of 90% or higher. This proven predictability of branches represents the underlying principle of program behavior that allows the branch prediction mechanism to record and predict which touch instructions will produce useful prefetches and discard (not execute) the touch instructions that produce unnecessary prefetches.

Thus our prefetching mechanism works because execution flow through a program is repetitive and branch actions are repetitive. Using FIG. 3, if the flow of a program is from program segment 1 to segment 3 to segment 6, then branch B1 is taken and branch B3 is not-taken. Since branch actions are highly repetitive, when the execution of the program is repeated there is a high probability that the execution flow of the program will again be from program segments 1, to 3, to 6.

Also, our prefetching mechanism discards inaccurate prefetching instructions during the decode cycle of a processor, long before the instruction's execution cycle. This simplifies the processor's design and improves overall performance and avoids the unnecessary complexity associated with rescinding (canceling) a useless prefetch or wasting valuable cache space or bus cycles once the prefetch is issued.

There are a number of patents directed to prefetching mechanisms, with each having certain advantages and disadvantages.

For example, several patents describe prefetching data inside a program loop.

U.S. Pat. No. 5,704,053 to Santhanam describes a mechanism where prefetching instructions are added to program loops. The technique uses execution profiles from previous run of the application to determine where to insert prefetching instructions in a loop.

U.S. Pat. No. 5,843,934 to Hsu determines the memory access pattern of a program inside a loop. Prefetches are scheduled evenly over the body of a loop. This avoids clustering of prefetches, especially when a prefetch causes castout or write back due to replacing a cache line that was previously updated. Prefetches are scheduled according to the number of loop iterations and number of prefetches to be performed on each loop iteration.

U.S. Pat. No. 5,919,256 to Widigen et al. describes a mechanism where data is prefetched from an operand cache instead of referencing memory. The data values from the operand cache are then used speculatively to execute instructions. If the data values retrieved from the operand cache equal the actual operand values the speculative executions are completed. If the values are unequal, all speculative executions are discarded.

U.S. Pat. No. 5,357,618 to Mirza determines a prefetch length for lines of stride 1, or N or a combination of stride values. Stride register are used to calculate the program's referencing pattern and special instructions are used to transfer values between the general-purpose registers and stride registers. The compiler uses these new instructions to control prefetching within a loop.

More general prefetching techniques include:

U.S. Pat. No. 5,896,517 to Wilson uses a background memory move (BMM) mechanism to improve the performance of a program. The BMM mechanism performs background memory move operations, between different levels of the memory hierarchy, in parallel with normal processor operations.

U.S. Pat. No. 5,838,945 to Emberson describes a prefetching mechanism where lines of variable sizes are fetched into the cache. A special instruction is used to indicate the length of the cache line that is prefetched, the cache set location to preload the prefetched data, and prefetch type (instruction or data).

U.S. Pat. No. 5,918,246 to Goodnow et al. describes a prefetch method that uses the compiler generated program map. The program map will then be used to prefetch appropriate instructions and data information into the cache. The program map contains the address location of branches and branch targets, and data locations used by the program.

U.S. Pat. No. 5,778,435 to Berenbaum et al. describes a history based prefetching mechanism where cache miss addresses are saved in a buffer. The buffer in indexed by an instruction address that was issued N cycles previously. The buffer value is then used as a prefetch address in an attempt to avoid cache misses.

U.S. Pat. No. 5,732,242 to Mowry describes a mechanism where prefetching instructions contain 'hint' bits. The hint bits indicate which prefetch operation is to be performed, i.e. the prefetch is exclusive or read only, and which cache set the line is loaded (least-recently-used or most-recently-used).

U.S. Pat. No. 5,305,389 to Palmer describes a prefetching mechanism that stores the access pattern of a program in a pattern memory. Prefetch candidates are obtained by comparing a current set of objects (accesses) to the objects (assesses) saved in the pattern memory. Pattern matches need not demonstrate a complete match to the objects saved in the pattern memory to generate a prefetch candidate. Prefetches are attempted for the remaining objects of each matching pattern.

SUMMARY OF THE INVENTION

In a system including a high speed buffer logically placed between memory and at least one processor unit, a method for executing an instruction stream stored in the memory, wherein the instruction stream comprises a sequence of instructions including at least one prefetch instruction that prefetches information from the memory into the high speed buffer, the method comprises the following steps: deriving first path data from a compiler performing static compilation, wherein the first path data represents a first path from the prefetch instruction to an instruction that uses information prefetched by the prefetch instruction; generating second path data, wherein the second path data represents a predicted second path of execution; determining whether the first path falls within the predicted second path; and prefetching instructions and data when the first path falls within the predicted second path.

U.S. Pat. No. 5,774,685 by Dubey, commonly assigned to the assignee of the present invention and herein incorporated by reference in its entirety, uses a prefetch instruction that encodes the branch path (which is determined by the compiler) between the prefetching instruction and the instruction that uses the data, where the branch path represents the actions (taken or not-taken) of the intervening branches. Each pre-fetched line is tagged with the speculative branch path information contained in the prefetch instruction. Special hardware exists to compare tagged information of a prefetched line to the actual action of the branches executed by the processor. Whenever the tagged information differs from the actual branch actions the prefetched line is discarded earlier, whereas, prefetched lines that have tags that equal the actual branch actions are retained longer in the cache.

Similarly, U.S. Pat. No. 5,742,804 to Yeh et al. describes a mechanism that only prefetches instructions. Branch prediction instructions are inserted into a program ahead of an upcoming branch. Each branch prediction instruction serves as a prefetching instruction and contains a guess field predicting the direction of the upcoming branch (taken or not-taken), a prefetch address, number of bytes to prefetch and a trace vector indicating the branch path leading to the upcoming branch. The trace vector is used to cancel issued prefetches by comparing the action of the upcoming branches to the actions predicted by the trace vector. No mechanism exists to prefetch data.

In addition, U.S. patent (application Ser. No. 08/599,833) to Puzak, commonly assigned to the assignee of the present invention and herein incorporated by reference in its entirety, describes a method that conditionally executes prefetch instructions. The mechanism uses a history table that records whether a previously executed prefetch instructions fetched information that was actually used by the processor. The table is called the Touch-History-Table. Information contained in the table is used to execute only those prefetch instructions that fetched useful data and discard (not execute) prefetch instructions that fetched unused data.

Using compilers to place touch instructions in a program is well know as a prefetching technique. For example, William Y. Chen, Scott Mahlke, Pahua Chang, and Wen-mei W. Hwu in "Data Access Micro-architectures For Superscalar Processors With Compiler-Assisted Data Prefetching", in the 24th Annual International Symposium on Microarchitecture, pages 69-73, November 1991, and Todd C. Mowry, in "Tolerating Latency Through Software-Controlled Data Prefetching", Ph.D. Thesis, Computer Systems Laboratory, Stanford University, Calif. 9305, March 1994 describe methods for placing touch instructions in a program to prefetch data into the cache as a means to reduce cache latency.

BRIEF DESCRIPTION OF THE DRAWINGS

FIG. 1 is a pictorial representation of a program with four load instructions and four prefetching instructions;

FIG. 4 illustrates the format of the touch instruction;

DETAILED DESCRIPTION OF THE PRESENT INVENTION

A general description of the operation of the prefetching mechanism is now set forth and a more detailed description to follow. It should be noted that the design description here is chosen for simplicity of exposition rather than optimality of design. For example, it is assumed that all instructions are executed in-order, however out-of-order designs are not precluded from the description presented.

Each touch instruction has a branch-mask-field (contained in the instruction) that describes the branch direction (either taken or not-taken) of the sequence of branches on the path between the touch instruction and the actual use of the datum prefetched by the touch instruction. The branch-mask-field indicates the path through the program from the touch instruction to the instruction that references the data item prefetched. The branch-mask-field is set by the compiler during code-generator of the program. By associating with each touch instruction an indication of the branch direction of each branch between the touch instruction and memory reference, a run-time branch-prediction mechanism is used to determine if a touch instruction is to be executed. Thus, after a touch instruction is decoded it is executed only after its branch-mask-field can be verified or validated to correspond to the path that the branch-predictor expects. If its branch-maskfield does not match the expected branch path chosen by the branch-prediction-mechanism it is discarded.

Figure 2:
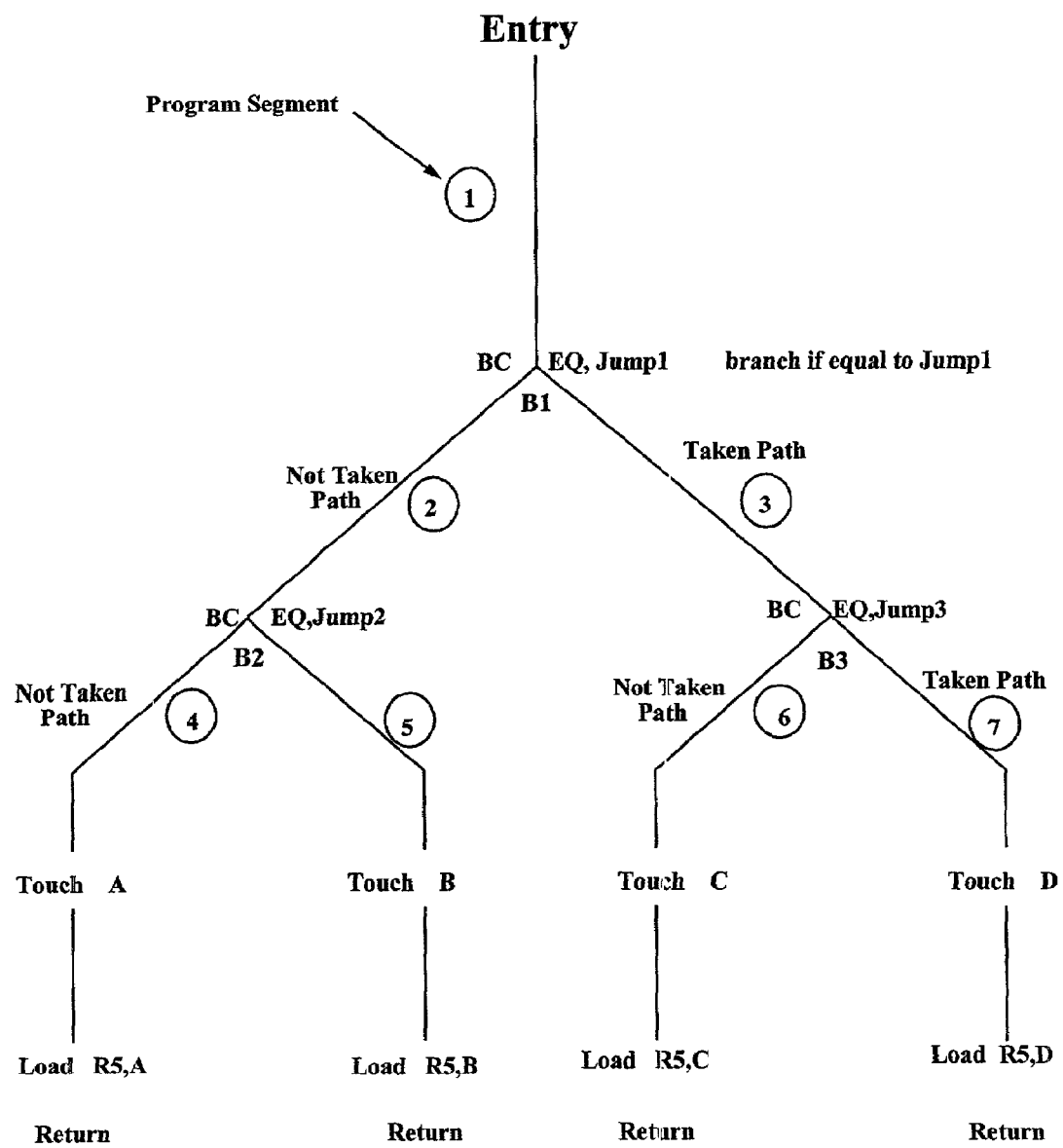
FIG. 2 is a control flow graph of the program.
Figure 3:
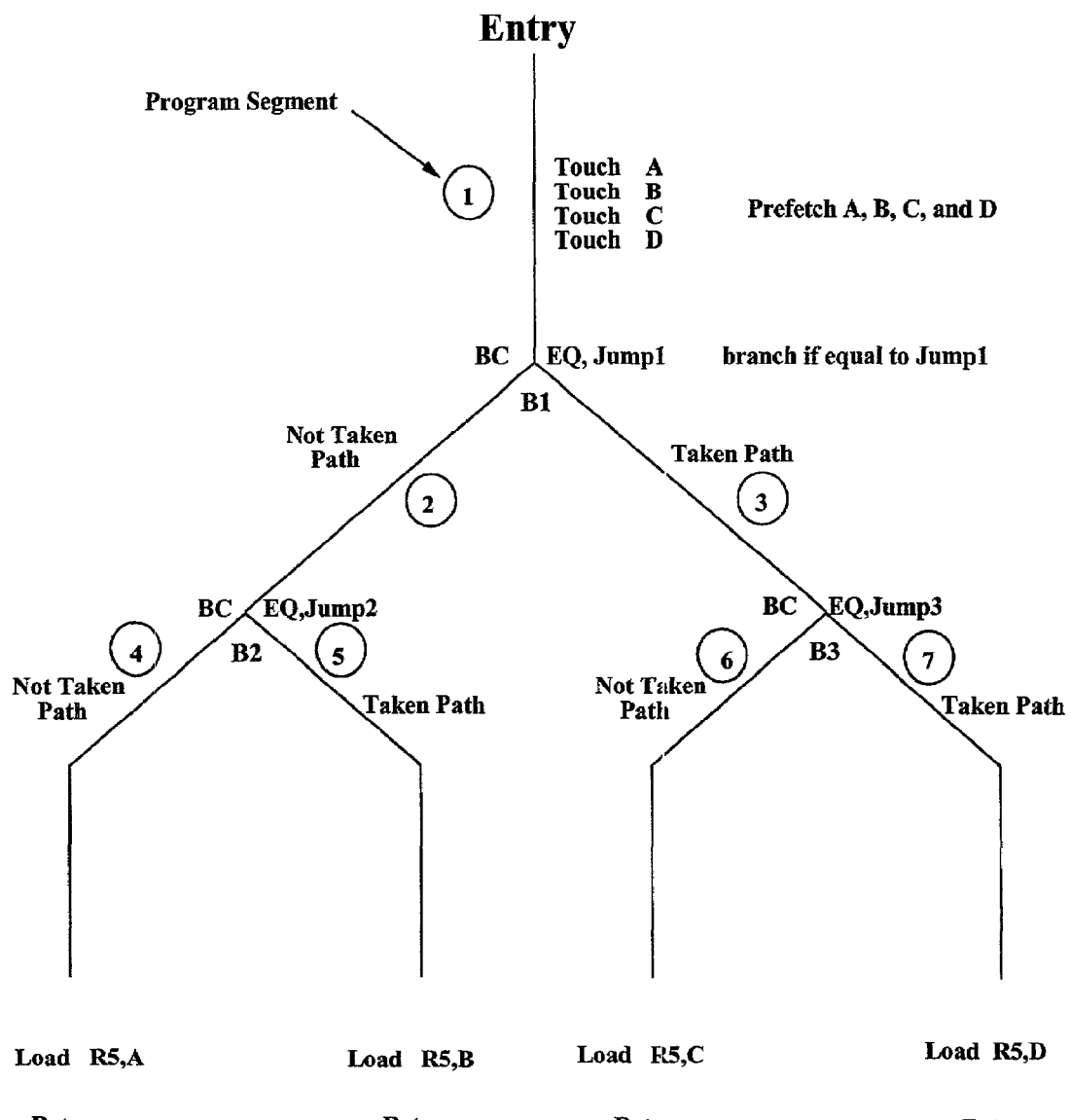
FIG. 3 is a control flow graph of the program with touch instructions moved to first program segment.

For example, using FIG. 3, when segment 1 is entered for the first time, two events occur in parallel. First, all four touch instructions are decoded and sent to the execution unit. Second, the branch prediction mechanism is consulted and determines that there is no branch history for instruction branch B1. In the absence of any branch history information, none of the touch instructions in program segment 1 will be executed. (Note, this decision is arbitrary and is a somewhat conservative prefetching strategy. Alternatives range from this to a more aggressive strategy to execute all touch instructions when no branch prediction history is available.)

As the program segments are executed, the branch prediction mechanism determines that branch B1 is taken and branch B3 is not-taken. This information is recorded by the branch prediction mechanism and associated with branch B1. When segment 1 is executed a second time, again two events occur in parallel. The four touch instructions are decoded and sent to the execution unit, and the branch prediction mechanism is again searched to determine the branch history associated with B1. This time, the branch history for B1 predicts that the outcomes of the next two branches are taken and then not-taken. This information is compared to a branch-mask-field contained in the touch instruction.

For example, the mask for instruction Touch A is two not-taken branches. The mask for instruction Touch B is a not-taken branch followed by a taken branch. Instruction Touch C has a mask of taken followed by not-taken, and instruction Touch D has a mask of two taken branches. Only those touch instructions that match the branch history information retained in the branch prediction mechanism will be executed. In this example only Touch C will be executed. The other touch instructions will be discarded because their branch mask information does not match the information obtained from the branch prediction mechanism.

Block C is prefetched and will be used as the program's execution flow goes from segment 1, to 3, to 6. This prefetching strategy is correct as long as the branch action representing the program's execution flow remains constant.

FIG. 4 shows the format of the Touch instruction 50. The instruction contains the following fields:

Opcode 51, this field represent the opcode used by the instruction.

Branch Mask 52, this field indicates the required outcome or direction of the next N unique (loop free) branches encountered between the touch instruction and the referencing of the data prefetched by the touch instruction. (Note, this decision is arbitrary and it is possible to consider all branch sequences, with loops and with out loops, in constructing the branch mask.) For example, from FIG. 3, when the compiler moves the touch instruction for datum C into segment 1, it is moved across two branches in the execution path of the program. Each branch outcome, required to reach the original referencing of datum C, is represented by an individual sub-field where each sub-field can have one of three values:

T, the branch is taken.

N, the branch is not-taken.

D, the branch can either be taken or not-taken. In this case the branch direction is 'don't care'.

(Note that each sub-field can take on three different values, so a branch mask field of five sub-fields has $3^5=243$ different possible combinations of taken, not-taken, and don't care values. This could be represented in a binary encoding of 8 bits, $2^8=256$.)

Touch address 53, this field indicated the address of the cache block that is to be prefetched. The format for this field may represent a base register and displacement value or a relative offset value from the touch instruction address. If a base and displacement representation is chosen then the prefetch address is the sum of the values contained in the base register and the displacement. If the prefetch address is specified through a relative offset then the value might indicate the number of bytes, words, or even cache lines, (plus or minus) relative to the touch instruction address.

The following examples would then represent the four touch instructions listed in FIG. 3.

Touch NNA

Touch NT,B

Touch TN,C

Touch TT,D

Here each touch instruction was moved up two branches in the program. If the branch mask field was four entries long (allowing a touch instruction to be moved across four branches) then the outcome of the last two branches would be represented by a 'don't care' condition, or D. For example, a four position branch mask for prefetching item C from segment 1 would be Touch TNDD,C. A touch instruction with a branch mask of all 'D's represents an 'always prefetch' condition. With this mask, a prefetch always occurs regardless of any branch history information found (or not found) by the branch prediction mechanism.

Both instructions and data can be prefetched using the touch instruction. For example, to prefetch instructions, the compiler can compute the address of a program segment that will be executed in the future by determining the relative distance (in bytes, words, or cache lines) between the current address in the program to the new segment. The touch instruction would then specify the prefetch address using this relative distance. Similarly, prefetching data can be accomplished by using relative offsets (when known) or through the use of base and displacement address specifications once the base register is set.

In the preferred embodiment of the present invention, a compiler can be augmented to generate code for a machine that implements a conditional prefetching mechanism as follows. The touch instructions as described above produce a (technical) result in a special class of registers (touch registers) and have the latency and memory properties of a load instruction to the same target address, except that addressing and page fault interrupts play no role. These touch registers need not correspond to physical registers in the computer. They are an artifact for the convenience of the compiler and are used to denote an explicit dependency between the touch instruction and the referencing of the data prefetched by the touch instruction.

During compilation, prior to the compiler's first pass of instruction scheduling, a touch instruction is inserted immediately preceding every memory reference (load or store or program segment), and the touch register result is included as an operand to the subject memory reference. This operand is used merely to represent to the compiler a technical dependency of the memory reference up the touch instruction. Furthermore, every memory reference for which a touch instruction has been generated is marked as having a much reduced latency, in general just one cycle. Now, during passes of instruction scheduling, the situation that has been set up will result in the compiler's attempting to reposition the touch instructions to cover all or part of their expected latency to their dependent memory reference. Recall, this dependency is represented by the added touch register operand of the memory reference.

In general, the occurrence of a conditional branch may limit the distance that the compiler can 'move up' a touch instruction to cover its latency. To detect this situation, after a pass of instruction scheduling, a scan is make to examine touch instructions that are at the heads of basic blocks. For each such instruction, if the compiler determines that its latency to all its uses has still not been completely covered, a special transformation is used to move the touch instruction up-stream across the branch. It is at this point that, the mask field of the touch instruction is modified to indicate the direction of the branch from which it was moved. Essentially, the mask field is shifted one sub-field position to the right (assuming that the branch mask is ordered so that sub-field 1 is at the left), and the taken/not-taken/don't care indicator is prefixed to it. After this transformation, if there has been any change, another pass of scheduling is made, which may result in further motion of the touch instructions. This scenario is repeated until further improvement is not considered worth the compile time cost of further scheduling passes. After this transformation, the mask field encodes the path from the prefetch instruction to the instruction that uses the information fetched by the prefetch instruction.

A final pass over the code should be made to eliminate redundancies. The simplest of such redundancies is when two touch instructions in the same basic block address items in the same cache line (but note that sophisticated alias analysis may be required to detect many of these kinds of redundancy, and that not all such are, in fact, detectable at compile time). A detectable case of this kind of redundancy may be introduced when the compiler moves a touch instruction upstream of a join point, resulting in one or more copies of the instruction. If this is detected, the redundancy can be eliminated by properly modifying the mask fields, i.e., whenever two sub-fields of the mask field differ, setting the sub-field to don't care. A somewhat more complex redundancy occurs when one touch instruction predominates another, both addressing items in the same cache line. Judgement must be exercised in when to eliminate such detected redundancies. If many instructions lie between what appear to be redundant touch instructions, and if there are dependant memory references in between, that later touch instruction may nevertheless be required because the cache line it references may be cast out from the cache by the time the later touch instruction is encountered. Such judgement will be embodied in the compiler heuristics that take into account the expected cache geometry of the target processors.

It should be readily understood by those skilled in the art that alternative compilation techniques can be used to generate and place the touch instructions and corresponding branch masks into the instruction stream for conditional execution, and that the present invention may be used with any alternative compilation technique.

Figure 5:
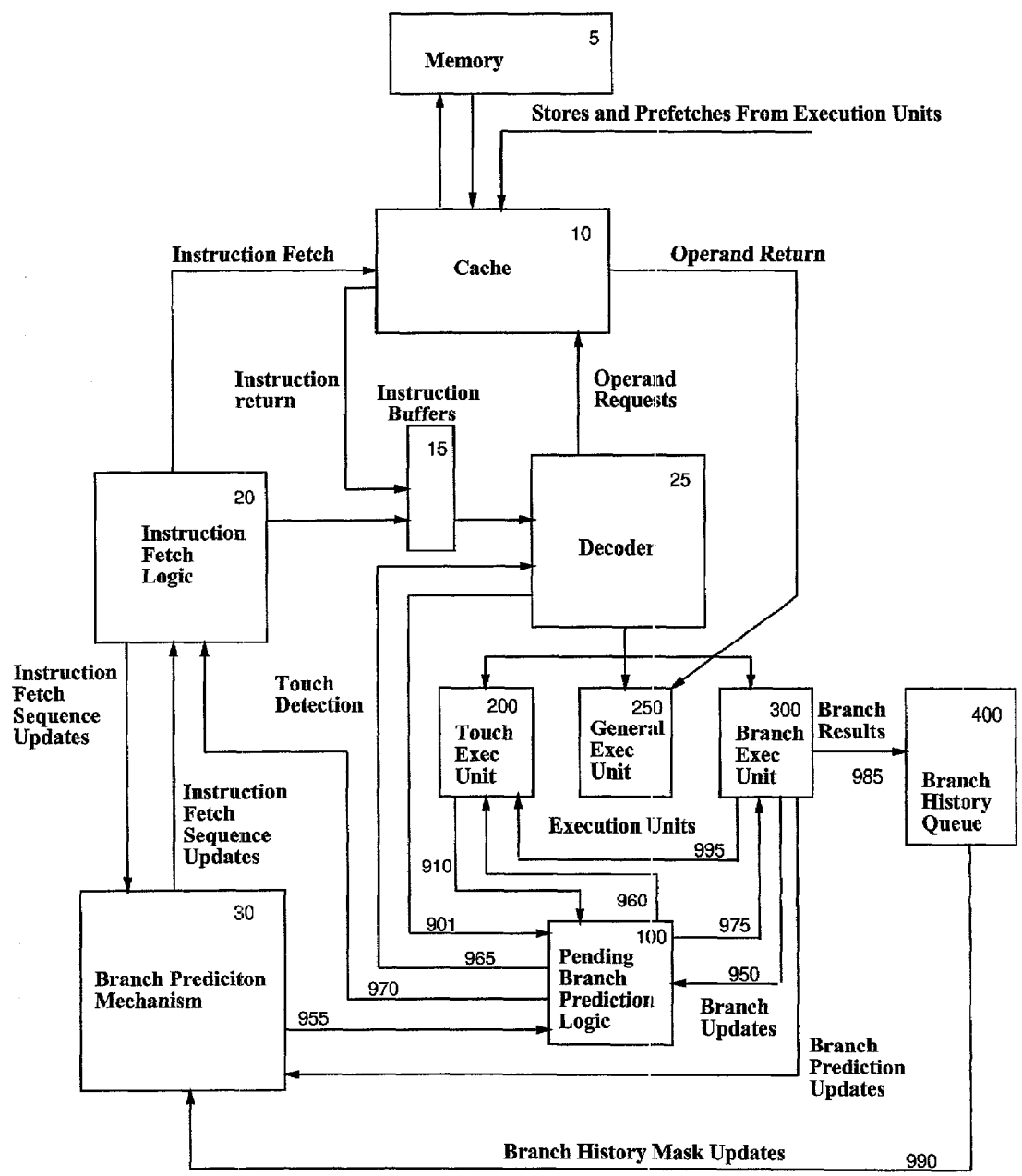
FIG. 5 is a functional block diagram of a processor including prefetch prediction controls according to the present invention.

FIG. 5 shows the major elements of a computer system necessary to support this prefetching mechanism. The figure shows the following components:

Memory 5: Stores instructions and operands for programs executing on the processor. The most recently used portions of memory are transferred to the cache.

Cache 10: High speed memory where instructions and data are saved. Supplies the instruction buffer with instructions and execution units with operands. Also receives updates (stores) and prefetch requests from the execution units. (Note, a common or unified cache is presented in this design description, however the description could easily be adapted to split or separate instruction and data caches.)

Instruction Buffer 15: Holds instructions that were fetched by the instruction fetch logic 20.

Decoder 25: Examines the instruction buffer and decodes instructions. Typically, a program counter (PC) register exists that contains the address of the instruction being decoded. After an instruction is decoded it is then sent to its appropriate execution unit. Touch instructions and branches are also processed by the pending branch prediction logic for further processing.

Execution Units, Executes instructions. Typically, a processor will have several execution units to improve performance and increase parallelism. In this description all touch instructions are assigned to the touch execution unit 200 and branches are sent to the branch execution unit 300. All other instructions go to the general execution unit 250. This configuration was chosen for simplicity and to present an explicit design. Clearly, many other execution unit configurations could be used with this mechanism. Associated with each execution unit is a execution-queue (not shown). The execution queue holds decoded instructions that await execution.

Branch Prediction Mechanism 30: Records branch action information (either taken or not-taken) for previously executed branches. Also guides the instruction fetching mechanism through taken and not-taken branch sequences and receives updates from the branch execution unit and branch history queue 400. Typically the branch prediction logic and instruction fetching logic work hand in hand with branch prediction running ahead of instruction fetching by predicting upcoming branches. The instruction fetching mechanism will use the branch prediction information to fetch sequential instructions if a branch is not-taken or jump to a new instruction fetch address if a branch is predicted as being taken. When working properly the branch prediction mechanism can detect (predict) taken branches early enough in time so that the instruction fetching mechanism can fetch the branch target before any stalls occur in the pipeline. The branch prediction mechanism functions similarly to a branch history table (BHT) described in U.S. Pat. No. 4,679,141 but contains additional information for each entry in the BHT (both taken and not-taken branches). The additional information describes the predicted branch action for the next N branches previously encountered by the processor. This information will be moved to the pending branch prediction logic 100. There it will be compared against the branch mask contained in the touch instruction. The operations of these mechanisms will be described below.

Figure 6:
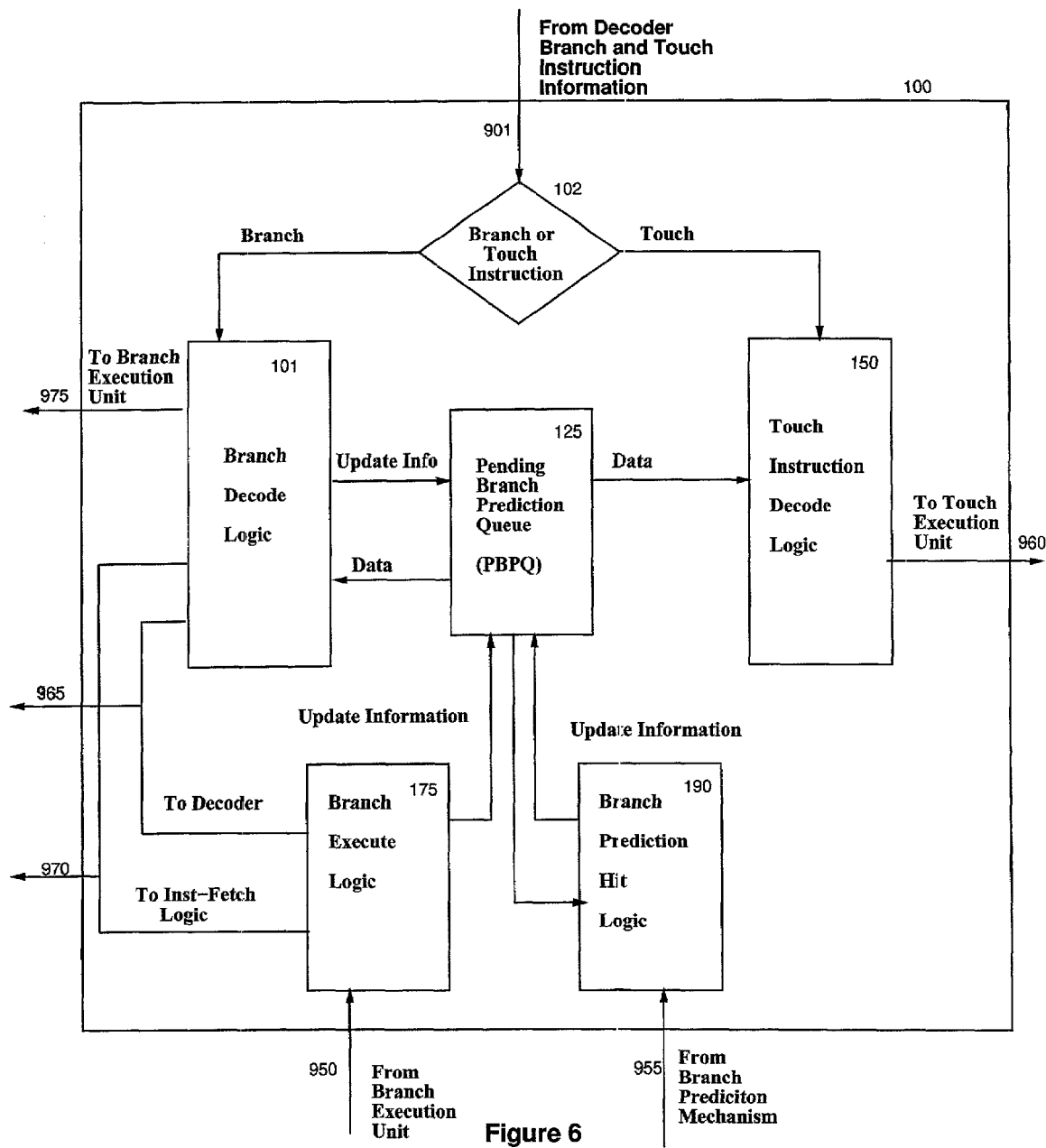
FIG. 6 is a functional block diagram of the Pending Branch Prediction Logic of FIG. 5 according to the present invention.

Pending-Branch-Prediction-Logic 100, FIG. 6 shows a general overview of the operation of the pending branch prediction logic with a more detailed description given below. The pending branch prediction logic contains five sub units: the pending branch prediction queue (PBPQ) 125, the branch decode logic 101, the touch instruction decode logic 150, the branch execution logic 175, and the branch prediction hit logic 190. The PBPQ holds prediction information describing the action of N branches, where each branch is detected (predicted) by the branch prediction mechanism 30 (in FIG. 5). This information will be used or modified by the other four sub units in the pending branch prediction logic. The decoder sends instruction decode information via path 901 to the instruction select control 102. If a branch is being decoded, control flow proceeds to the branch decode logic 101, or if a touch instruction is decoded, the touch instruction decode logic 150 is entered. The branch decode logic supplies the branch execution unit with the branch prediction information (via path 975), and resets the decoder (via path 965) and instruction fetch logic (via path 970) with address sequencing information after a decoded branch. The touch instruction decode logic 150 compares the branch mask contained in each touch instruction to the branch history information saved in the PBPQ. Only those touch instructions with matching branch masks are sent on to the touch execution unit. The branch execute logic 175 checks the branch prediction information against the actual execution results of the branch. When prediction errors are detected, the PBPQ is purged, and the instruction fetching unit and decoder are restarted. The branch prediction hit logic 190 saves branch prediction information in the PBPQ. This information is used by the other sub-units in the pending branch prediction logic. The operation of these four sub units will described more fully below.

It is noted that many of the functions described in the pending branch prediction logic would actually be integrated into the decoder, branch prediction mechanism, or execution units of a processor. Typically, cycle time constraints would require certain parts of this logic to be placed within these units. However, they are described below separately for simplicity of exposition.

Figure 7:
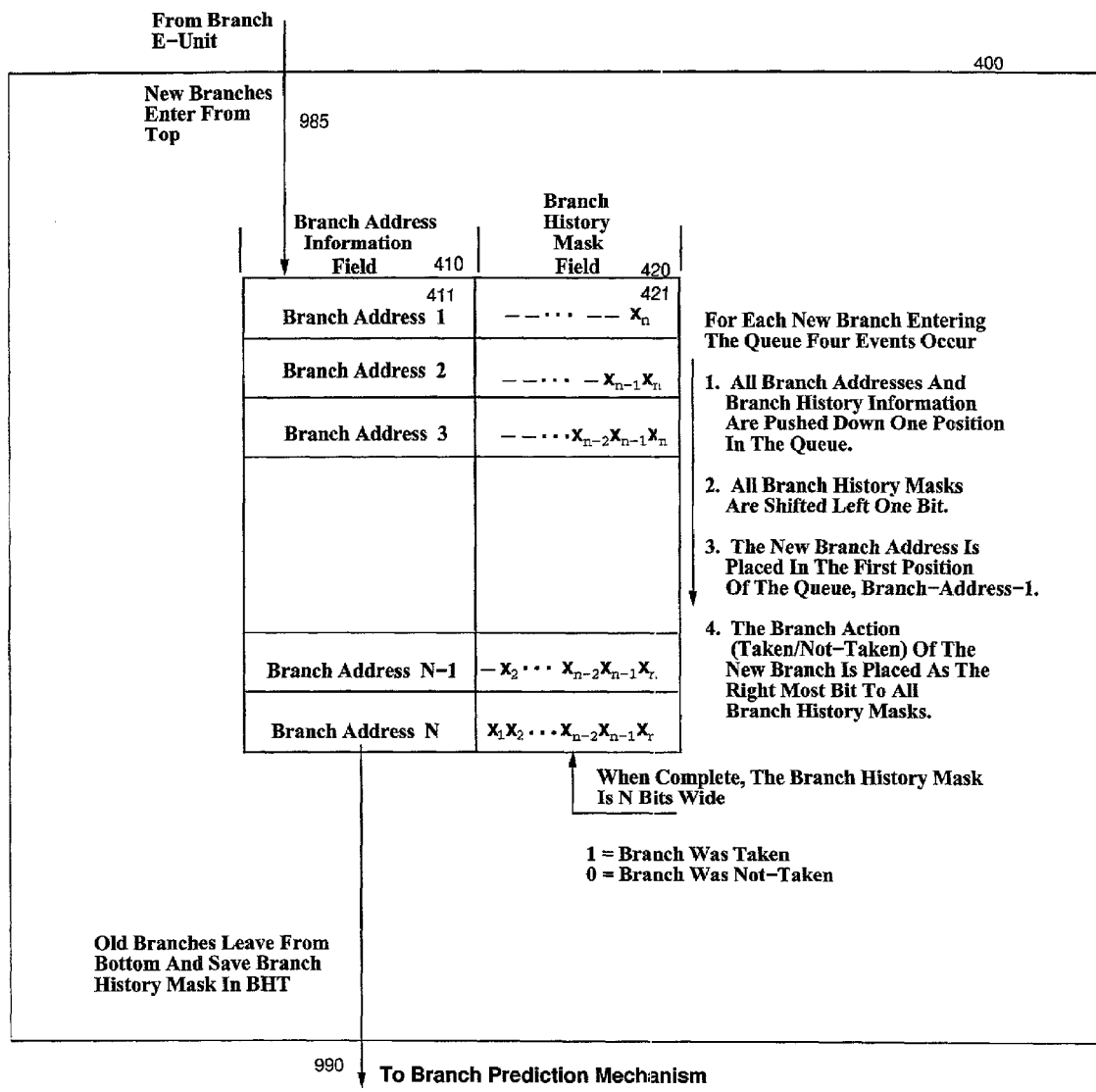
FIG. 7 is a functional block diagram of the Branch History Queue of FIG. 5 according to the present invention.

Branch History Queue (BHQ) 400: For each branch executed by the processor, temporarily records taken/not-taken actions of branches executed subsequent to this branch. The function of the BHQ is to form the branch history mask for each entry in the BHT. This mask is then compared to the branch mask of the touch instructions that are being decoded. FIG. 7 shows the essential features of the Branch History Queue. The figure shows the BHQ arranged as an array of entries consisting of a branch address information field 410 and a branch history mask field 420. Contained in the branch address information field are N branch address entries 411. Associated with each branch-address entry 411 is a branch history mask 421 consisting of N bits. Each of the N bits represents the action (either taken or not-taken) of N branches encountered by the processor and correspond to the N sub-fields in the touch instruction's branch mask.

The branch history queue can be implemented as a first-in-first-out (FIFO) queue where each new branch encountered by the processor is placed on the queue. When a branch is executed by the processor, four actions occur. First, all existing branch-address entries and their corresponding branch mask information are pushed down one position in the queue. This frees up the first position of the queue for the new branch-address entry. Second, all branch history masks are shifted left 1 bit, making room for the branch action of the new branch that just entered the queue. Third, the address of the branch is placed in branch-address-1 of the BHQ and the branch history mask field is cleared. The branch address is set via path 950. Fourth, the new branch action is then added as the rightmost bit to all branch history masks in the branch history queue. Constructing the branch history mask in this manner aligns each branch action field to match the order of the N sub-fields of the branch mask found in the touch instruction.

For example, the figure shows only the rightmost bit of the first entry of the BHQ filled in. Here, $X_n$ represents the action of the branch. In fact, the nth bit of each branch history mask represents the action of the branch found in the first position of the branch history queue. The second entry of the queue (branch-address-2) has only the two rightmost entries filled in. Here $X_{n-1}$ represents the action of the branch identified in its branch address field and $X_n$ represents the action of the branch executed next. Note, this is the branch in the first position of the BHQ. The branch history mask in the third entry of the BHQ only has the three rightmost branch actions filled in. Here, $X_{n-2}$ represents the action of the branch identified by its branch address field, $X_{n-1}$ represents the action of the branch executed after this branch (the branch in the second position of the BHQ) and $X_n$ represents the action of the second branch executed after this branch (this is the branch in the first position of the BHQ). Finally, the last entry on the BHQ shows a branch history mask that is N bits wide and completely filled in. The bits are numbered $X_1, X_2, \ldots X_{n-2}, X_{n-1}, X_n$. Here, $X_1$ describes the action of the branch identified by the branch-address field. Its value can either be a 1 representing the branch was taken or a 0 meaning the branch was not-taken. Bit $X_2$ describes the action of the branch executed after the branch identified in the branch-address field. Then bit $X_3$ (not shown in the figure) describes the action of the second branch executed after the branch identified in the branch-address field and so on, with the action of the last three branches executed labeled $X_{n-2}, X_{n-1}$, and $X_n$. These identify the action of the branches in the third, second, and first positions of the BHQ, respectively.

For each new branch that enters the BHQ a branch must leave (is pushed out) the BHQ (ignoring startup conditions). When a branch leaves the BHQ its branch mask is complete. The branch mask is then saved in the BHT for future reference. This process involves search the BHT with the address of the branch leaving the BHQ. If a match is found, then the branch mask is saved with the matching BHT entry. This branch mask represents the program path of the next N branches executed by the processor. If a branch is not found in the BHT, a new entry is made.

Instruction Fetch Logic 20, Here instructions are fetched from the cache and placed in the instruction buffer 15. The instruction fetching controls must communicate with the branch prediction mechanism 30 to determine when instruction fetching should proceed along a sequential path of a program or when to jump to a new instruction address due to a predicted branch. Typically, the branch prediction mechanism is far enough ahead of the instruction fetching controls (both in time and branch predictions) that instruction fetching can seamlessly fetch instructions into the instruction buffer without incurring pipeline stalls due to taken branches.

We can now fully describe the actions of this invention. It is convenient to consider this mechanism as three independent but synchronized processes: instruction fetching (including branch prediction), decode, and execution.

Figure 8:
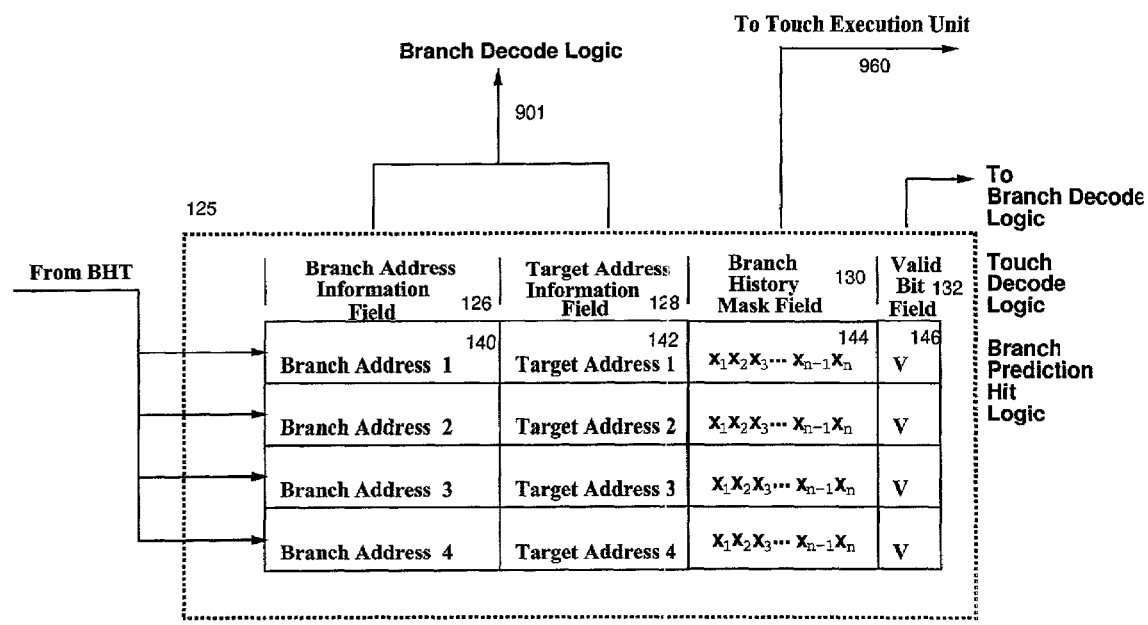
FIG. 8 is a functional block diagram of the Pending Branch Prediction Queue of FIG. 6 according to the present invention.

The instruction fetching process fetches instructions into an instruction buffer along predicted paths of a program. These paths are based on predictions made by the branch prediction mechanism. When a branch is detected by the branch prediction mechanism, an entry is make in the PBPQ. This consists of saving the branch address, predicted target address, and branch history mask in the PBPQ. FIG. 8 gives a more detailed description of the PBPQ. The PBPQ is arranged as an array of entries having a branch address information field 126, a target address information field 128, a branch history mask field 130, and a valid bit field 132. The branch address information field contains individual branch address entries 140, where a branch address entry identifies the address of a branch whose direction was predicted by the branch prediction mechanism. It is noted that each address saved in the branch address field can be abbreviated or truncated. It is possible to save only a subset of the bits that make up the full branch address in each PBPQ entry. Associated with each branch address entry in the PBPQ are a branch target entry 142, a branch history mask 144 entry, and valid bit 146. The branch target field identifies the predicted target address of the corresponding branch identified by the branch address field. The branch history mask contains N bits, where each bit represents the predicted action (either taken or not-taken) of the next N branches that are encountered by the processor and corresponds to the N sub-fields in the touch instruction's branch mask. For example, the first bit of the branch history mask represents the predicted action of branch identified in the corresponding branch address field. The second bit represents the pre-dieted action of the branch that will be executed by the processor following the branch found in its corresponding branch address field. Then, the third bit represents the predicted action of the second branch that is executed after the branch identified in the branch address field. Finally, the nth bit represents the predicted action of the n−1 branch executed after the branch found in the branch address field. The valid bit associated with each branch address field indicates if the branch address entry is valid. A zero (0) represents not-valid and a one (1) represents valid.

It is convenient to think of the PBPQ as queue with the first entry (or head) as being the oldest entry. New entries are added to the first available free entry starting from the head of the queue and searching to the end. Entries are removed from the head of the queue and all valid sub-entries are pushed up one position.

Figure 9:
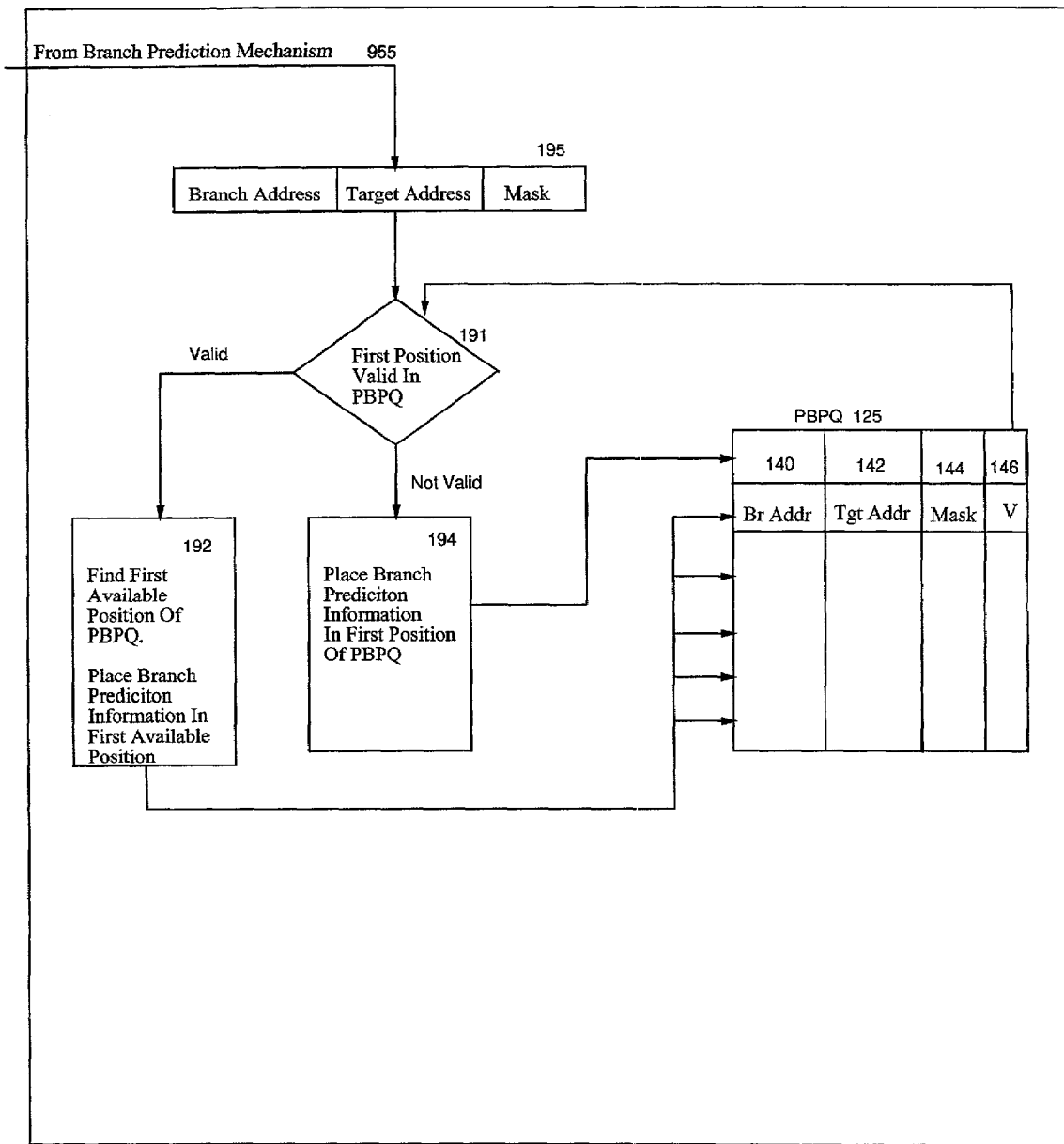
FIG. 9 is a functional block diagram of the Branch Prediction Mechanism Hit Logic of FIG. 6 according to the present invention.

FIG. 9 shows in more detail the operations of the branch prediction mechanism hit logic 190. The figure shows a branch prediction entry 195 supplied by the branch prediction mechanism. Each branch prediction entry has a branch address, prediction target address, and predicted branch history mask. Recall the branch history mask is constructed in the branch history queue and sent to the branch prediction mechanism when complete. Valid detect logic 191 determines if the first position of the PBPQ is valid. If the first position is valid then a valid signal is sent to select logic 192 where the first available position in the PBPQ is found. Here, the PBPQ is updated and the branch prediction entry is saved and the valid indicator 146 is set to 1. If the first position of the PBPQ is invalid, select logic 194 is enabled and the branch prediction information is saved in the first position of the PBPQ with the valid bit 146 set to 1.

The instruction fetching mechanism is guided by the predicted branch address information found in the PBPQ. Blocks of instructions are fetched and placed in the instruction buffer and each new block of instructions fetched contains the next set of instructions in sequence following the previously fetched block. Typically, each block is aligned on a quad-word or double-quad-word (16 or 32 byte boundaries). However, branches in the instruction stream cause breaks in the sequential fetching of instructions and must be detected or predicted by the instruction fetch mechanism. The PBPQ provides the necessary information to guide the instruction fetching controls along sequential paths of a program or across jumps in a program caused by branches.

Jumps in the instruction stream are detected by comparing the instruction fetch address to the predicted branch addresses contained in the PBPQ. If a match is found and the branch is predicted as being taken then the next instruction fetch address will be the predicted target address of the branch found in the PBPQ. If a match is not detected or the branch is predicted as not-taken then the next instruction fetch will be the block of instructions that is sequentially next to the previous block fetched.

If the instruction buffer queue is full then the instruction-fetching process must wait until a slot becomes available. Slots become available when all of the instructions contained in the block are decoded. The branch prediction process must wait when there are no free slots in the PBPQ. Slots become available as branches are decoded. Note, the branch prediction will be checked by the execution unit when the branch is executed. The prediction information will be contained in the decode information that is sent by the decoder to the execution unit. If, in the execution process, a branch prediction error is detected, all instructions fetched into the instruction buffer following the mispredicted branch and all entries in the PBPQ are discarded.

The decode process takes instructions from the instruction buffer and sends them to the appropriate execution unit. Parallel to the decode process all touch instructions and branch instructions are also sent to the pending branch prediction mechanism for processing. Recall, from FIG. 6 all branch instructions are sent to the branch decode logic and touch instructions are sent to the touch instruction decode logic in parallel with the decode cycle.

Figure 10:
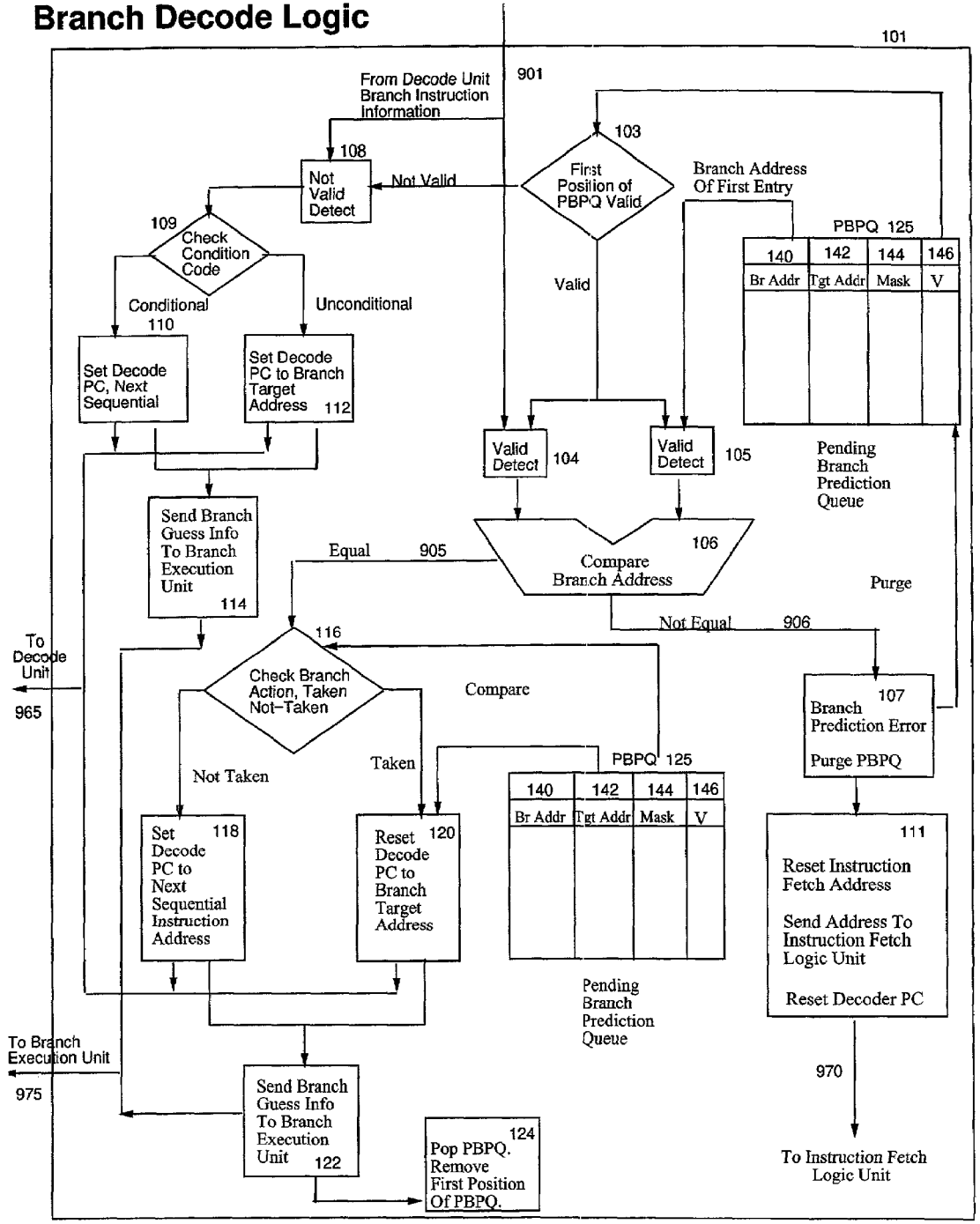
FIG. 10 is a functional block diagram of the Branch Decode Logic of FIG. 6 according to the present invention.

FIG. 10 shows in more detail the operations of the branch decode logic 101 within the pending branch prediction mechanism. Each time a branch is decoded, its address is compared to the oldest branch address in the PBPQ 125. The first entry in the PBPQ will always correspond to the oldest entry. Select logic 103 determines if the first entry is valid. If the first entry is valid, gates 104 and 105 are enabled and if the first entry is invalid gate 108 is activated. If gates 104 and 105 are enabled then the address of the branch being decoded is compared to the branch address field 140 of the oldest entry in the PBPQ 125. If a match occurred then the predicted program path is accurately following the actual path of the program. A match signal is sent via path 905 to the branch prediction select logic 116. Here, the first branch prediction bit of the branch history mask 144 is examined to determine if the prediction of the branch is taken or not-taken. If the branch is predicted as taken, the decoder's program counter is set to the predicted target address of the branch instruction. If the branch is predicted as not-taken, the decoder's program counter is set to the address following the branch instruction. The branch guess information is then sent to the branch execution unit 300 (shown in FIG. 5) via path 975. This includes branch pre-diction (taken or not-taken) and predicted target address. Finally, the first entry in the PBPQ is removed and all other entries are pushed up one position using logic 124. This frees one position in the PBPQ. This free position is then marked invalid.

Returning to address compare logic 106, if the address of the branch being decoded does not match the address of the predicted branch found the PBPQ, a branch prediction error has occurred. The program is not following the path predicted by the branch prediction mechanism. When this occurs, a purge signal is sent via path 906 to the PBPQ using branch prediction error logic 107. Also, when a branch prediction error occurs, the instruction fetch logic must be restarted. The instruction buffer is purged and instruction fetching begins anew at the address following the branch just decoded using logic 111 and path 970.

Returning to the valid select logic 103 if the first (oldest) entry of the PBPQ is invalid, the branch pre-diction mechanism has not yet predicted a branch. Typically, this event occurs when the processor is executing a program for the first time or after existing branch information has aged out of the BHT in the branch prediction mechanism. When this occurs, the branch prediction mechanism is void of any branch information and is unable to supply information about any upcoming branches. However, the branch decode logic must still supply the branch execution logic with branch prediction information and the decoder with the address of the next instruction to continue decoding. Gate 108 detects an invalid PBPQ entry and forwards condition code and branch address information to select logic 109. Here, the condition code of the branch is examined. If the branch is an unconditional branch (always taken) then the decoder's program counter is set to the target address of the branch using logic 112. If the branch is conditional, it is assumed that the branch is not-taken and the decoder will continue to decode instructions following the branch. Noted that this strategy is chosen for simplicity. Clearly more elaborate strategies can by designed to predict the direction of a branch when the PBPQ is void of any prediction information. For example, the condition code can be examined on an individual opcode basis and different taken/not-taken decisions can be chosen. Finally, the branch prediction information is sent to the branch execution unit using logic 114 and path 975.

The decoder will also assign each branch instruction with an unique instruction-identifier (IID). This IID is used to control the execution sequence of each touch instruction in the touch execution unit. For example, a designated register in the decoder is used to assigned the branch IID values. Typically, the register is increment by one each time a branch is decoded. The branch IID is then set equal to the value of the register.

Figure 11:
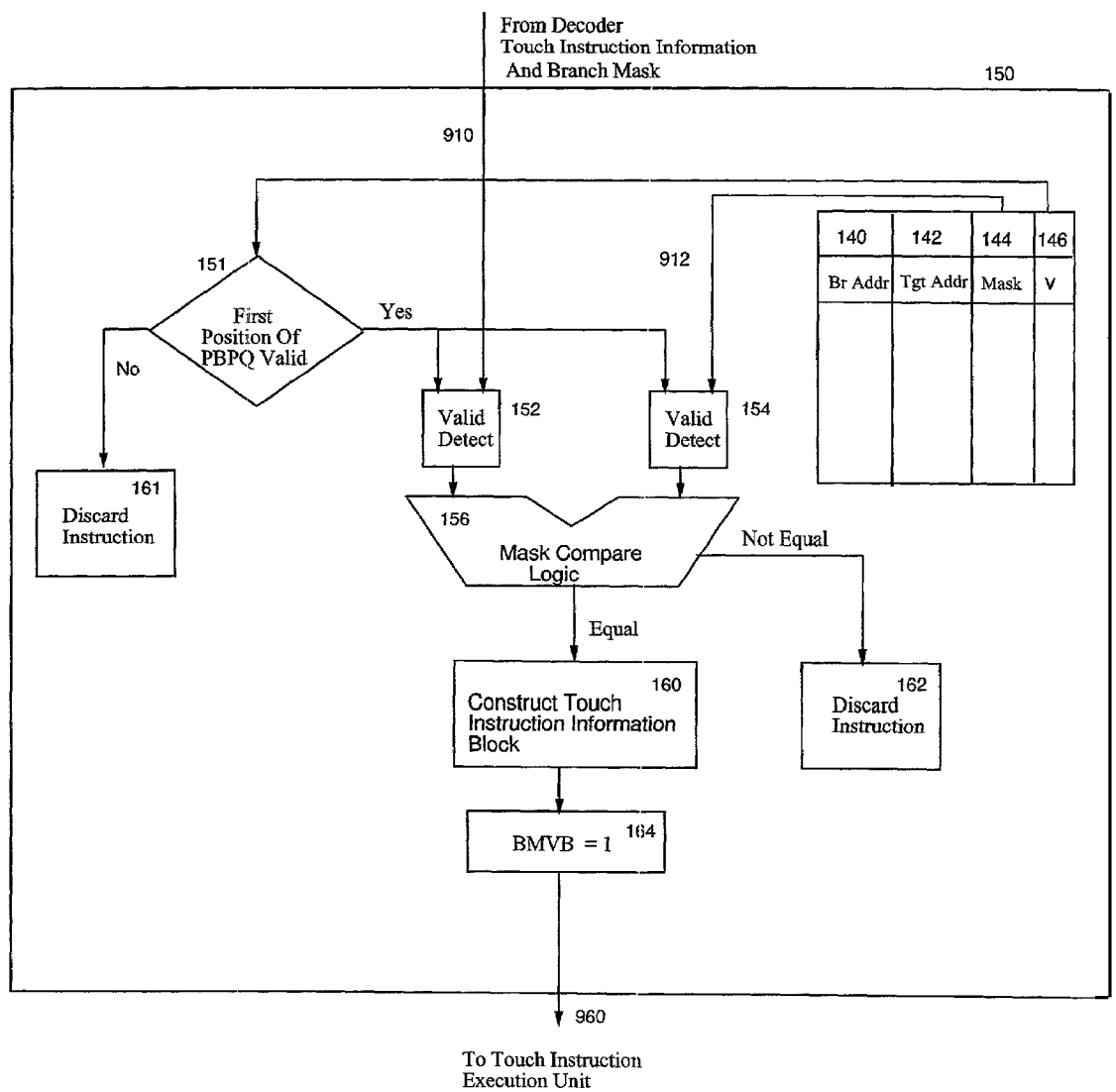
FIG. 11 is a functional block diagram of the Touch Instruction Decode Logic of FIG. 6 according to the present invention.

FIG. 11 shows the structure and operations of the touch instruction decode logic 150. Recall, from FIG. 6, the touch instruction decode logic is called whenever a touch instruction is decoded. Select logic 151 determines if the first entry of the PBPQ is valid. If it is valid, gates 152 and 154 are enabled. These gates allow the branch mask of the touch instruction being decoded (send via path 910) and branch history mask of the first entry in the PBPQ (sent via path 912) to be passed to the mask compare logic 156.

Figure 12:
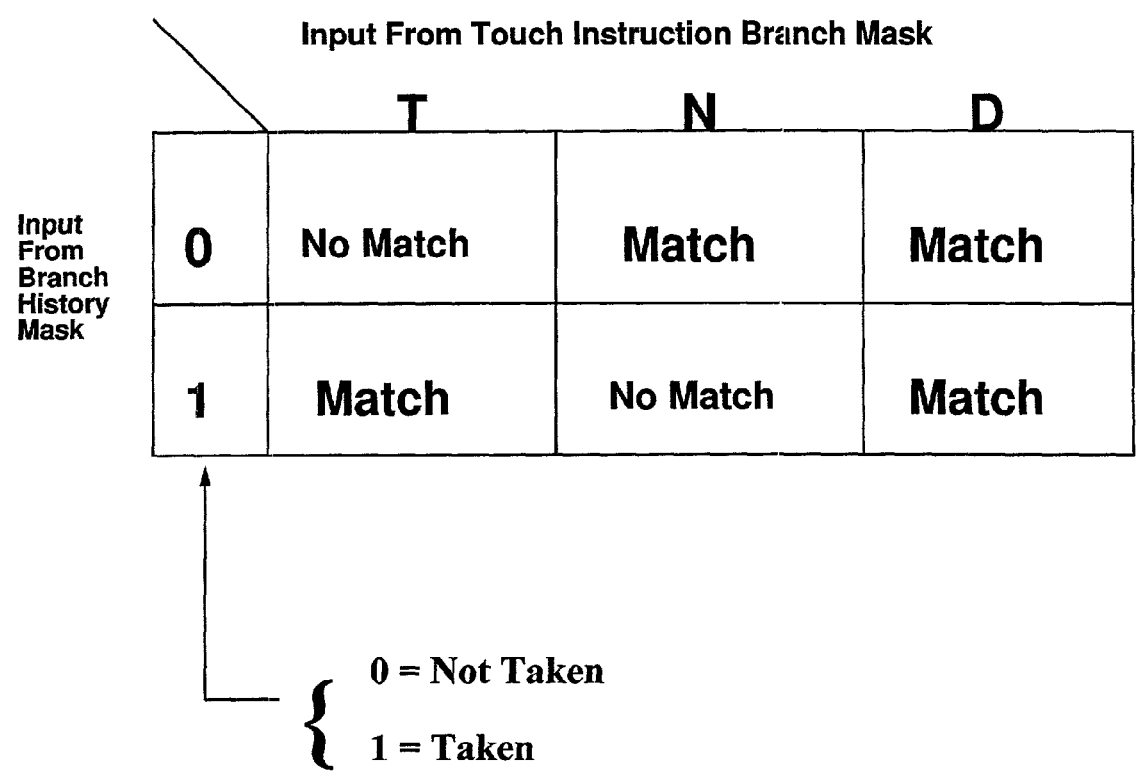
FIG. 12 is a table illustration of the mask compare logic for comparing the branch history mask to the branch mask in the touch instruction.

FIG. 12 shows a table that summarizes mask compare logic 156. The branch history information is compared to the branch mask of the touch instruction. That is, each sub-field of the branch mask of the touch instruction is compared to the corresponding bit of the branch history mask. If the nth bit of the branch history mask is a 1 (for a taken branch) then the nth sub-field of the touch instruction's branch mask must specify taken or 'T' for a match. Similarly, if the nth bit of the branch history mask is a 0 (for a not-taken branch) then the nth sub-field of the branch history must specify not-taken or 'N' for a match. However, if the nth sub-field of the touch instruction's branch mask is a 'D' for don't care, then a match occurs whether the nth bit of the branch history field is 0 or a 1. All compare results are then ANDed together to produce the final equal/not-equal results. All sub-field compare results must equal a 'match' for a final results to represent a 'match'. If any sub-fields produce a 'no-match' condition then the final results will be 'no-match'. Only those touch instructions with matching branch mask are sent onto the touch instruction execution unit for execution.

Returning to FIG. 11, if mask compare logic determines that branch masks are not equal, the instruction is discarded using logic 162. However, if the masks are equal, a touch-instruction-information block is assembled using logic 160. The touch instruction along with the touch-instruction-information block are sent to the touch instruction execution unit. There each touch instruction is executed.

Figure 13:
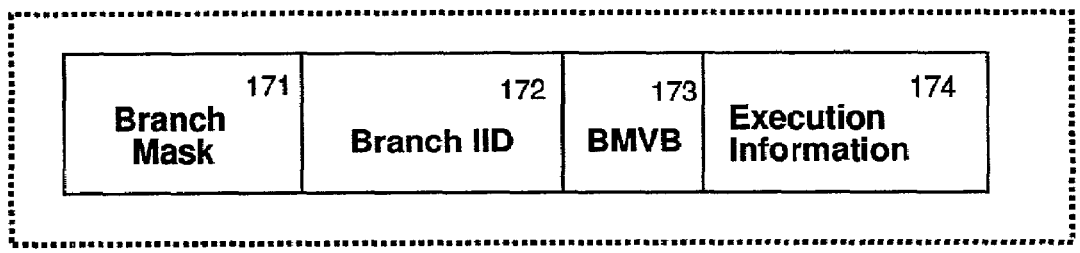
FIG. 13 illustrates the format of the touch instruction information block.

FIG. 13 shows the format of touch-instruction-information block 170. Each entry has the following fields.

Branch Mask 171: The program path that describes the action of up to N branches that occur between the touch instruction and the referencing of the data prefetched by the touch instruction. This information is contained in the touch instruction and described in FIG. 4.

Branch IID 172: The instruction identifier for the branch instruction that was decoded before the touch instruction. This identifier will be used to sequence the execution of branch instructions with the touch instruction that immediately follow the branch. Each touch instruction decoded is assigned the IID of the last decoded branch.

Branch Mask Validation Bit (BMVB) 173: The bit indicates if the touch instruction can be executed. The bit is set to one if the branch mask of the touch instruction has successfully matched the branch history mask found in the PBPQ. This indicates that the touch instruction can be executed. If the bit is zero, the branch mask has not (yet) matched the branch history mask of a predicted branch. Only those touch instruction with a BMVB set to one are executed by the touch instruction execution unit.

Execution Information 174: Control signals and information needed for execution of the instruction. For example, the address of the item prefetched (touched) by the touch instruction is needed for instruction execution. This value may have already been calculated or specified by listing designated registers, or displacement and register values.

The branch mask 171, branch IID 172, and execution information 174 of touch information block are constructed using logic 160. The branch mask valid bit is set to 1 in logic 164. This information is then sent to the touch instruction execution unit.

Returning to valid select logic 151, if the first entry of the PBPQ is invalid, there is not a valid branch history mask to compare to the branch mask in a touch instruction. When this occurs the touch instruction is discarded using logic 161.

Typically, when a touch instruction is decoded, the branch prediction mechanism will be sufficiently ahead of the decoder and will already have predicted the outcome of the next upcoming branch. This is evident by the fact that the branch prediction mechanism can stay ahead of the decoder predicting branches. That is, the branch prediction mechanism is generally far enough ahead of the decoder to have predicted the next upcoming branch when a branch is decoded. As described above, the only time the branch prediction mechanism has not predicted the next branch should occur when the processor is executing a program for the first time. When this event occurs the prefetching mechanism described herein is biased to avoid prefetching. Only those touch instruction whose branch mask matches the predicted path of branch pre-diction mechanism are sent to the execution unit for execution.

Figure 14:
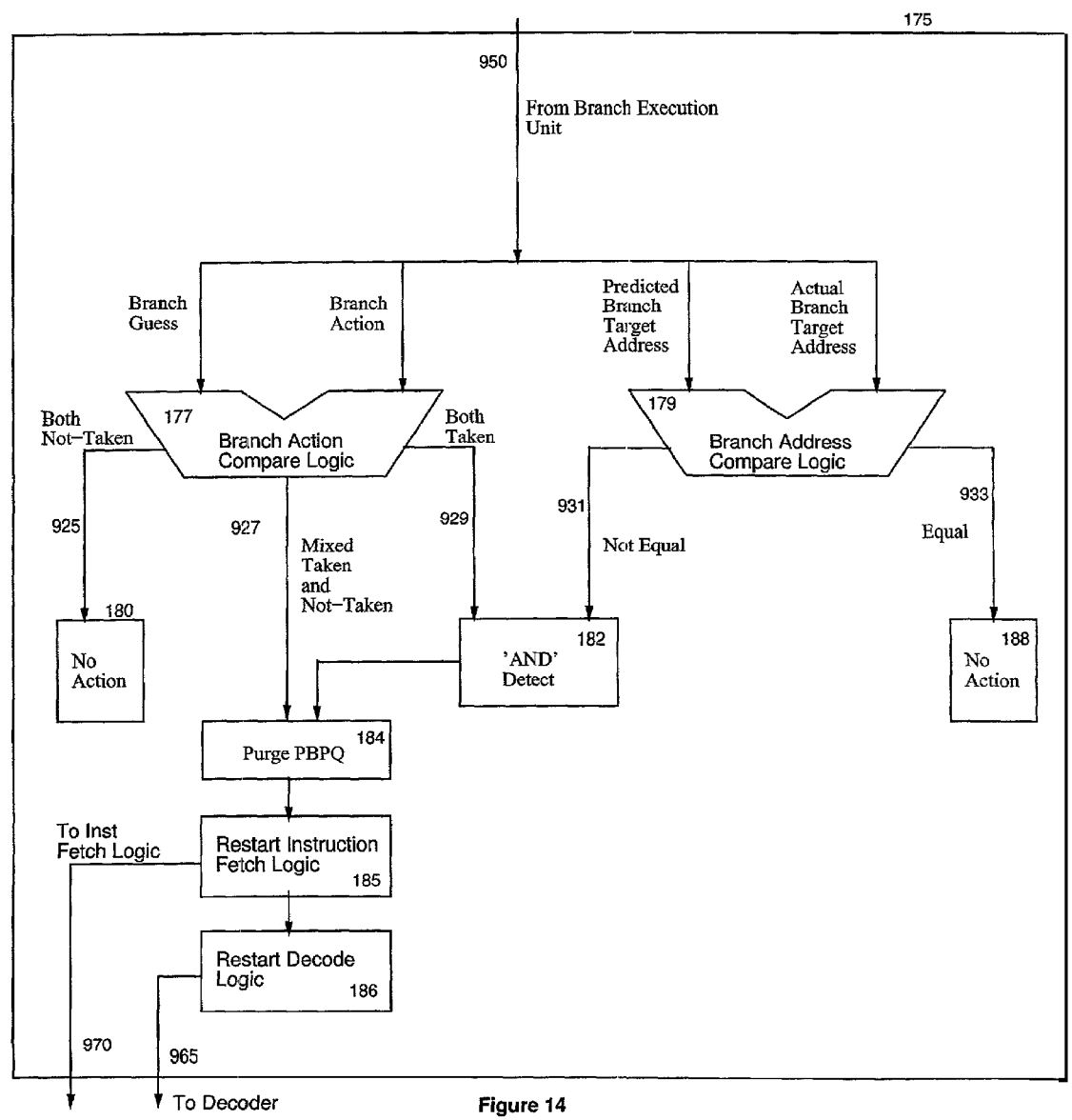
FIG. 14 is a functional block diagram of the branch execute logic of FIG. 6 according to the present invention.

The execution process takes instructions from the execution queues and executes the instructions. When a branch is executed its prediction is checked. The branch prediction is checked by the branch execute logic. FIG. 14 shows the operation of the branch execute logic 175. The figure shows that the branch execution unit returns the following information to the branch execution logic:

Branch guess, The branch prediction (either taken or not-taken) made by the branch decode logic.

Branch action, The actual branch action (either taken or not-taken).

Predicted target address, The predicted target address made by the branch decode logic.

Actual branch target, The actual target address of the branch. This address is computed during the decode cycle. Note, typically the decoder includes an address generation mechanism for instructions that reference memory.

This information is passed via path 950. The branch guess and actual branch direction are compared using branch action compare logic 177 and the predicted branch address and true branch address are compared using branch address compare logic 179. The branch action compare logic 177 has three outputs. If the predicted action and actual branch action are not-taken, signaled on path 925, then no action is required (logic 180). If the predicted action and actual action are both taken, path 929, the results of the branch address compare logic 179 are checked. If the predicted branch address does not match the actual branch address, path 913, 'AND' detect logic 182 is activated and the PBPQ is purged using logic 184. Additionally, the instruction fetching logic and decoder are notified to begin following the instruction after the branch using logic 185 and 186. If the predicted branch address and actual branch address are equal, path 933 is enabled and no action is required, logic 188, The third output from the branch action compare logic, path 927, detects when the predicted branch direction does not match the actual branch direction. Here the branch was either predicted as taken and was not-taken at execution time or the branch was predicted as not-taken and was actually taken. When this occurs the prediction was wrong and the pipeline must be restarted. The PBPQ is purged using logic 184 and the instruction fetch logic and decoder are restarted following the branch using logic 185 and 186.

Figure 15:
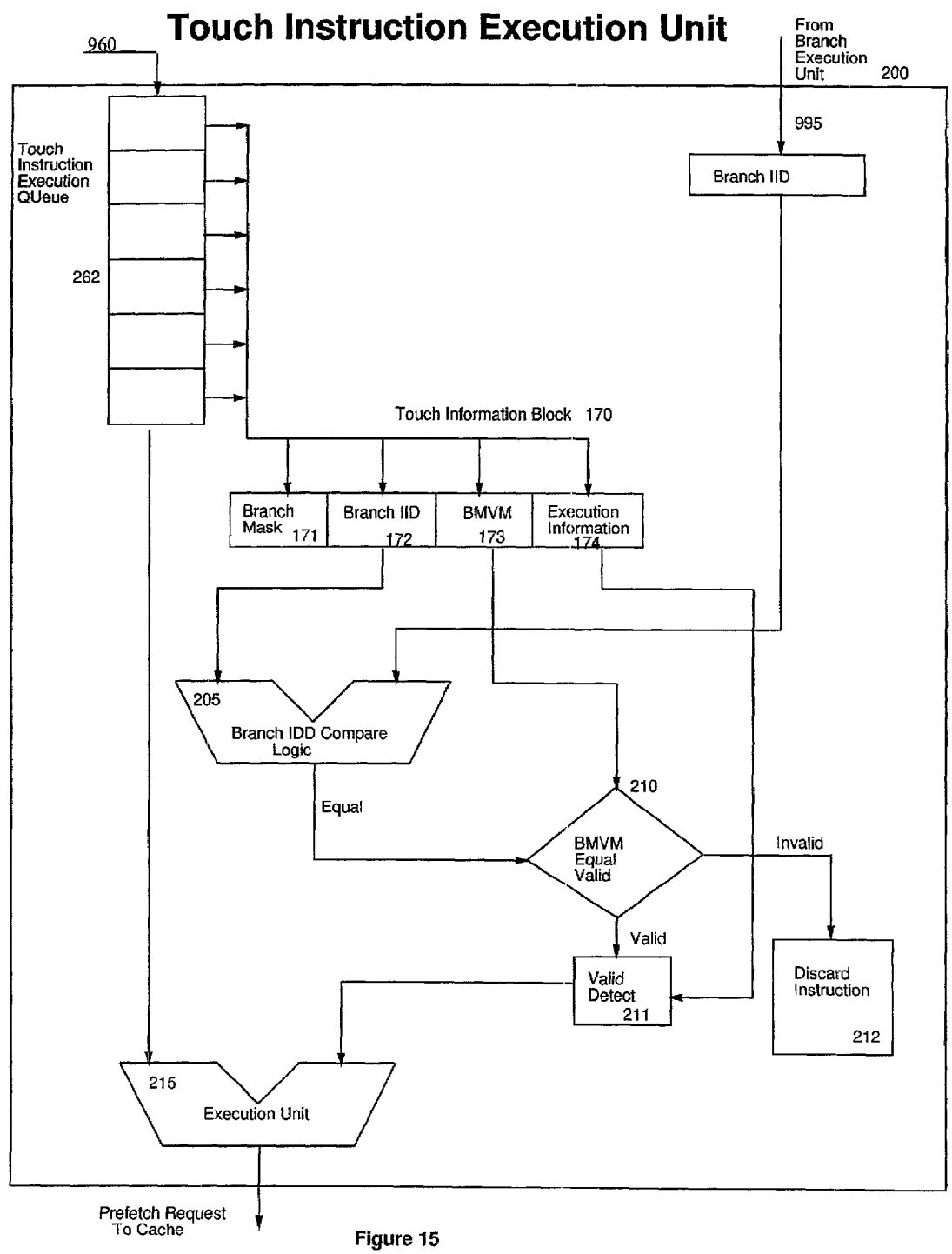
FIG. 15 is a functional block diagram of the touch instruction execution unit of FIG. 5 according to the present invention.

FIG. 15 shows the operation of the touch instruction unit 200. If the branch was correctly predicted, the IID of the branch is sent to the touch instruction execution unit. The figure shows the IID of the branch supplied via path 995. Decoded touch instructions are held in the touch instruction execution queue 262. Compare logic 205 examines the branch IID of each touch instruction held in the touch execution queue and compares it to the branch IID supplied by the branch execution unit. Touch instructions that have matching branch IIDs are sent to select logic 210. Here the BMVB is checked. If BMVB is 1 (valid), the touch instruction is executed using logic 215. When the touch instructions is executed a prefetch request is sent to the cache. If the cache line identified by the prefetch request is not in the cache (a cache miss), the line is fetched from memory and placed in the cache. If the BMVB is 0 (invalid) the instruction is discarded. Only those touch instructions having a matching branch IID and a branch-mask-validation-bit of 1 are then executed. When the touch instruction is executed its prefetch request is sent to the cache.

It is noted, a prefetch buffer may be added to the cache 10. A prefetch buffer holds those lines of memory that are transferred from memory as the result of a prefetch request (such as a request stemming from a touch instruction), and not as the result of a normal cache miss. Note, when a cache design provides for prefetching, two types of misses may occur: prefetch misses and demand (or normal) misses. A prefetch miss is a prefetch request that causes a cache miss. In this instance, the line returned from memory is sent to the prefetch buffer and will be transferred to the cache when it is used by the processor. On the other hand, a normal miss (or demand miss) is a cache miss that was not a cache prefetch. In this instance, the line of memory that is returned after the miss is sent directly to the cache and is not written into the prefetch buffers. The demand miss is the result of a normal instruction fetch, the operand requests from the decoder or address-generate mechanism, and stores sent to the cache from the general execution unit.

Prefetch buffers are well known in the art. For example, IBM Technical Disclosure Bulletin articles: "A Method to Allow Instruction Cache Access During a Reload Sequence", October 1992, No. 342; "Early Pre-fetch Buffer", Vol. 34 No. 10b March 1992 pp. 63-64; "New Context Bit", July 1987 pp. 510 describe miss or prefetch buffers in which a line of memory is transferred into a buffer before it is loaded into the cache, all incorporated herein by reference in their entirety.

Described above is a mechanism used to predict the success or failure of a prefetching instruction placed in a program by the compiler or programmer. The prediction occurs during the decode cycle of a processor. The mechanism is a preferred prediction mechanism but does not indicate that alternative schemes are less effective. Alternative designs are given below.

The branch history mask sent by the branch prediction mechanism does not have to represent the exact pattern of taken and not-taken branches following the predicted branch. For example, the branch prediction mechanism can derive the branch history mask from a collection of history bits for each branch in the BHT. The branch history mask can then be constructed using the collective history of the actions of the individual branches.

In an alternative embodiment, the branch history mask can be constructed dynamically from the predicted branches that already exist on the PBPQ. For example, if there are four predicted branches on the PBPQ when a touch instruction is decoded, the branch history mask can be constructed dynamically and set equal to their individual taken/not-taken predicted sequence. If the branch mask specified in the touch instruction is longer than the dynamically constructed branch history mask, then don't care conditions can be added to the branch history mask.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a system including a high speed buffer logically placed between memory and at least one processor unit, a method for executing an instruction stream stored in the memory, wherein the instruction stream comprises a sequence of instructions including at least one prefetch instruction that prefetches information from the memory into the high speed buffer, the method comprising the steps of:

deriving first path data from a compiler by analyzing control flow information during compilation, wherein the first path data represents a first path from the prefetch instruction to an instruction that uses information prefetched by the prefetch instruction;

obtaining a branch history defining a path from information generated by branches encountered prior to a subsequent encounter of the prefetch instruction;

generating second path data, wherein the second path data represents a predicted second path of execution;

determining whether the first path is consistent with the predicted second path; and prefetching instructions and data when the first path is consistent with the predicted second path.

2. The method of claim 1, wherein the second path data is derived from information characterizing dynamic execution of the sequence of instructions by the at least one processor unit.

3. The method of claim 1, wherein the prefetch instruction is added to the instruction stream for
execution by the at least one processor unit upon determining that the first path falls within the predicted second path.

4. The method of claim 1, further comprising the step of:
upon determining that the first path does not fall within the predicted second path, omitting the prefetch instruction from the instruction stream executed by the at least one processor unit.

5. The method of claim 1, wherein the second path data are associated with one or more branch instructions, and wherein the second path data comprises a mask that represents a predicted path of execution that follows the associated branch instructions.

6. The method of claim 5, wherein the first path data comprises a mask that represents a path of execution from the prefetch instruction to the instruction that uses the information prefetched by the prefetch instruction.

7. The method of claim 6, wherein the second path data are based upon accumulation of predictions associated with branch instructions.

8. The method of claim 7 wherein the second path data is derived from predictions based upon previous execution of the instruction stream.

9. The method of claim 1, wherein the prefetch instruction includes a field that identifies an instruction to prefetch from memory into the high speed buffer.

10. The method of claim 1, wherein the prefetch instruction includes a field that identifies data to prefetch from memory into the high speed buffer, wherein the data is operated on by at least one instruction in the instruction stream.

11. In a system including a memory storing an instruction stream comprising a sequence of instructions including at least one prefetch instruction, a processor unit for executing the sequence of instructions, and a high speed buffer logically placed between the memory and the at least one processor unit, an apparatus for conditionally executing the prefetch instruction comprising:
decode logic for deriving first path data from a compiler performing static compilation, wherein the first path data represents a first path from the prefetch instruction to an instruction that uses information prefetched by the prefetch instruction;
logic for obtaining a branch history defining a path from information generated by branches encountered prior to a subsequent encounter of the prefetch instruction;
path prediction logic for generating second path data, wherein the second path data represents a predicted second path of execution;
compare logic for determining whether the first path is consistent with the predicted second path; and
execution logic for conditionally prefetching instructions and data when the first path is consistent with the predicted second path.

12. The apparatus of claim 11, wherein the second path data is derived from information characterizing dynamic execution of the sequence of instructions by the at least one processor unit.

13. The apparatus of claim 11, wherein the execution logic executes the prefetch instruction
upon determining that the first path falls within the predicted second path.

14. The apparatus of claim 11, wherein the execution logic omits execution of the prefetch instruction upon determining that the first paths does not fall within the predicted second path.

15. The apparatus of claim 11, wherein the second path data are associated with one or more branch instructions, and wherein the second path data comprises a mask that represents a predicted path of execution that follows the associated branch instructions.

16. The apparatus of claim 15, wherein the first path data comprises a mask that represents path of execution from the prefetch instruction to the instruction that uses the information prefetched by the prefetch instruction.

17. The apparatus of claim 16, further comprising branch prediction logic for generating predictions associated with branch instructions, and a branch history queue for accumulating the predictions generated by the branch prediction logic, wherein the second path data generated by the path prediction logic is based upon the predictions accumulated in the branch history queue.

18. The apparatus of claim 17, wherein the predictions are based upon previous execution of the instruction stream.

19. The apparatus of claim 11, wherein the prefetch instruction includes a field that identifies an instruction to prefetch from memory into the high speed buffer.

20. The apparatus of claim 11, wherein the prefetch instruction includes a field that identifies data to prefetch from memory into the high speed buffer, wherein the data is operated on by at least one instruction in the instruction stream.

* * * * *